United States Patent
Stafford

(10) Patent No.: US 10,764,547 B2
(45) Date of Patent: Sep. 1, 2020

(54) FOVEATED NEAR TO EYE DISPLAY SYSTEM USING A COMPUTATIONAL FREEFORM LENS VIA SPATIAL LIGHT MODULATION OF A LASER PROJECTED IMAGE ONTO AN EMISSIVE FILM

(71) Applicant: Sony Interactive Entertainment Inc., Tokyo (JP)

(72) Inventor: Jeffrey R. Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/021,661

(22) Filed: Jun. 28, 2018

(65) Prior Publication Data
US 2020/0007838 A1    Jan. 2, 2020

(51) Int. Cl.
| | | |
|---|---|---|
| *H04N 9/31* | (2006.01) | |
| *G09G 3/00* | (2006.01) | |
| *G02B 3/08* | (2006.01) | |
| *G02B 5/18* | (2006.01) | |

(52) U.S. Cl.
CPC .......... *H04N 9/3188* (2013.01); *G02B 3/08* (2013.01); *G02B 5/1842* (2013.01); *G09G 3/001* (2013.01); *H04N 9/317* (2013.01); *H04N 9/3185* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | |
|---|---|---|
| 2003/0090756 A1 | 5/2003 | Moon et al. |
| 2008/0212034 A1 | 9/2008 | Aksyuk et al. |
| 2009/0303597 A1 | 12/2009 | Miyawaki et al. |
| 2010/0296143 A1 | 11/2010 | Reichelt et al. |
| 2015/0208144 A1 | 7/2015 | Holmes |
| 2015/0316766 A1* | 11/2015 | Weaver ................. G09G 3/001 345/591 |
| 2017/0097562 A1* | 4/2017 | Wu ........................ G02B 27/14 |
| 2018/0003962 A1* | 1/2018 | Urey ................. G02B 27/0172 |

OTHER PUBLICATIONS

International Search Report and Written Opinion from the counterpart PCT application PCT/US2019/037073 dated Oct. 4, 2019.

* cited by examiner

*Primary Examiner* — Aneeta Yodichkas
(74) *Attorney, Agent, or Firm* — John L. Rogitz

(57) ABSTRACT

A projection system projects images onto a projection surface in, for example, a computer game head-mounted display (HMD). The light is projected through a spatial light modulator that is combined with a Freeform Fourier Lens that is a combination of a Fresnel lens, an X-phase grating, a Y-phase grating, and a radial grating. The freeform lens causes the gradual shrinking of portions of the laser-projected image, decreasing the perceived pixel pitch in at least one foveal area on the projection surface compared to a non-modulated laser image. The center positions of the Fresnel lens and radial grating can be changed in the X and Y axes, moving the condensed foveal areas in accordance with eye tracking of the user. In effect, the system projects a Foveated image that contains variable pixel pitch such that a user perceives a higher visual acuity in his gaze direction.

19 Claims, 8 Drawing Sheets

FOVEATED NEAR TO EYE DISPLAY SYSTEM USING A COMPUTATIONAL FREEFORM LENS VIA SPATIAL LIGHT MODULATION OF A LASER PROJECTED IMAGE ONTO AN EMISSIVE FILM

FIELD

The application relates generally to foveated near to eye display systems using a computational freeform lens via spatial light modulation of a laser projected image onto an emissive film.

BACKGROUND

As recognized herein, for some laser projection applications such as head mounted displays (HMD) for computer games for augmented reality (AR) and/or virtual reality (VR), to enhance the user experience, it is desirable to present high acuity of images.

SUMMARY

As also understood herein, the resolution of the laser can be relaxed while still providing high acuity images for a wide field of view AR/VR system by matching the projection system to the visual acuity mapping of the human eye, thereby efficiently using projection pixels, bandwidth and the light sources.

Accordingly, in some example embodiments a projection system such as a laser liquid crystal on silicon (LCOS) or scanning laser projects an image with a large depth of field (focus free image) onto a spatial light modulator such as a reflective LCOS that is altered by a phase-only image of a Freeform Fourier Lens. The Freeform Fourier lens, which may be implemented in software, can be a combination of a Fresnel lens, an X-phase grating, a Y-phase grating, and a radial grating, with a center that can be adjusted within the entire phase image. The freeform lens causes the gradual shrinking of the laser-projected image around one or more areas within the image, decreasing the perceived pixel pitch in at least one foveal area on the projection surface compared to a non-modulated laser image. The center positions of the Fresnel lens and radial grating can be changed in the X and Y axes, moving the condensed image center within the total projected area defined by the laser image on the projection surface. The gratings and/or lens can be dynamically adjusted to steer the center of the condensed image around based on a user's eye gaze onto the projected surface. Additionally, the freeform lens may adjust the focus of the projected image on projection surface.

In addition to the lens with gratings, keystone correction/adjustment lenses/gratings can be applied to distort the projected image to the projection surface. Alternatively, other forms of distortion correction (barrel distortion correction, etc.) can be applied instead of or in addition to keystone correction, which will allow for projection onto curved or other non-flat surfaces. As used herein, "distortion/adjustment assembly" refers to keystone adjustment, barrel distortion correction, and other forms of distortion correction.

In effect, the system projects a Foveated image that contains variable pixel pitch such that a user perceives a higher visual acuity in his gaze direction to the projected surface without requiring the laser projector to have increased resolution. Thus, the projection system can more closely match the visual acuity mapping of the human eye and be more efficient at using projection pixels, bandwidth and the light sources.

An example projection surface can be a phosphor based emissive display, that when excited by one wavelength of light such as ultra-violet (UV) produces another wavelength. Such a system would provide a wide field of view (FOY) image with very large viewing angles and therefore a large eye-box. Alternatively, the projection surface can be a diffuse or reflective screen or an optical combiner such as a beam splitter or a holographic optical element. These are non-limiting examples of projector surfaces and optical combiners.

Accordingly, an apparatus includes a projection system configured to project an image onto a projection surface through a spatial light modulator operably associated with a phase-only image of a Freeform Fourier Lens FFL). The FFL can include a Fresnel lens, an X-phase grating, a Y-phase grating, and a radial grating. The FFL causes gradual shrinking of portions of the images from the projection system, decreasing perceived pixel pitch in at least one foveal area on the projection surface. The gratings can be configured to move a condensed image center within the image based on a user's eye gaze onto the projection surface.

It should be noted that a single apparatus may be provided for a display monitor application in, for instance, a laptop or personal computer or two apparatus may be provided (one for the left eye and one for the right eye) in a stereoscopic application such as a virtual reality or augmented reality head-mounted display (HMD).

In some examples, the projection system and spatial light modulator are supported in a head-mounted display (HMD). Other non-limiting examples of devices that can incorporate the projection system and spatial light modulator include laptop computers, personal computer displays, and other displays typically looked at by only a single person.

In example embodiments, at least one distortion/adjustment assembly is configured to distort the image projected to the projection surface in accordance with a shape of the projection surface.

In some embodiments, the projection surface includes a phosphor-based emissive display, that when excited by one wavelength of light produces another wavelength of light. In other embodiments, the projection surface includes a diffuse screen or a reflective screen, or an optical combiner. The projection system may include a liquid crystal on silicon device (LCOS), Digital Micro mirror Device (DMD), Digital Light Processing (DLP), Liquid Crystal Display (LCD), Micro-Electro Mechanical System (MEMS), or any other form of light modulator. The projection system may use laser or other forms of light sources like a narrow band LED. Alternatively, the projection system may consist of a back lit or edge lit Liquid Crystal Display (LCD), Organic Light-Emitting Diode display (OLED), Micro Light-Emitting Diode display (Micro-LED, mLED, uLED) or any other light emitting device. Optionally, the projection system can include projection optics to adjust the projected image to impinge onto the spatial light modulator. The projection optics can include Aspheric lenses, Fresnel Lenses, Thin-Film Lenses, Holographic Optical Elements or any form of optical device to adjust the projected image to the active area of the spatial light modulator.

In another aspect, a method includes identifying a direction of a user's gaze, and projecting, onto a projection surface, a Foveated image that contains variable pixel pitch with a higher visual acuity in a central portion of the image than in peripheral portions of the image. The method also includes moving the central portion of the image according to the direction of a use's gaze.

In another aspect, an assembly includes at least one projection surface, at least one projection system configured to direct light representing demanded images onto the projection surface, and at least one spatial light modulator interposed in an optical path between the projector and the projection surface to reflect light from the projector onto the projection surface. The assembly further includes a least one processor configured with instructions to send phase information to the spatial light modulator according to information from an eye tracking module indicating a gaze pose of a user.

The details of the present application, both as to its structure and operation, can best be understood in reference to the accompanying drawings, in which like reference numerals refer to like parts, and in which:

DETAILED DESCRIPTION

Figure 1:
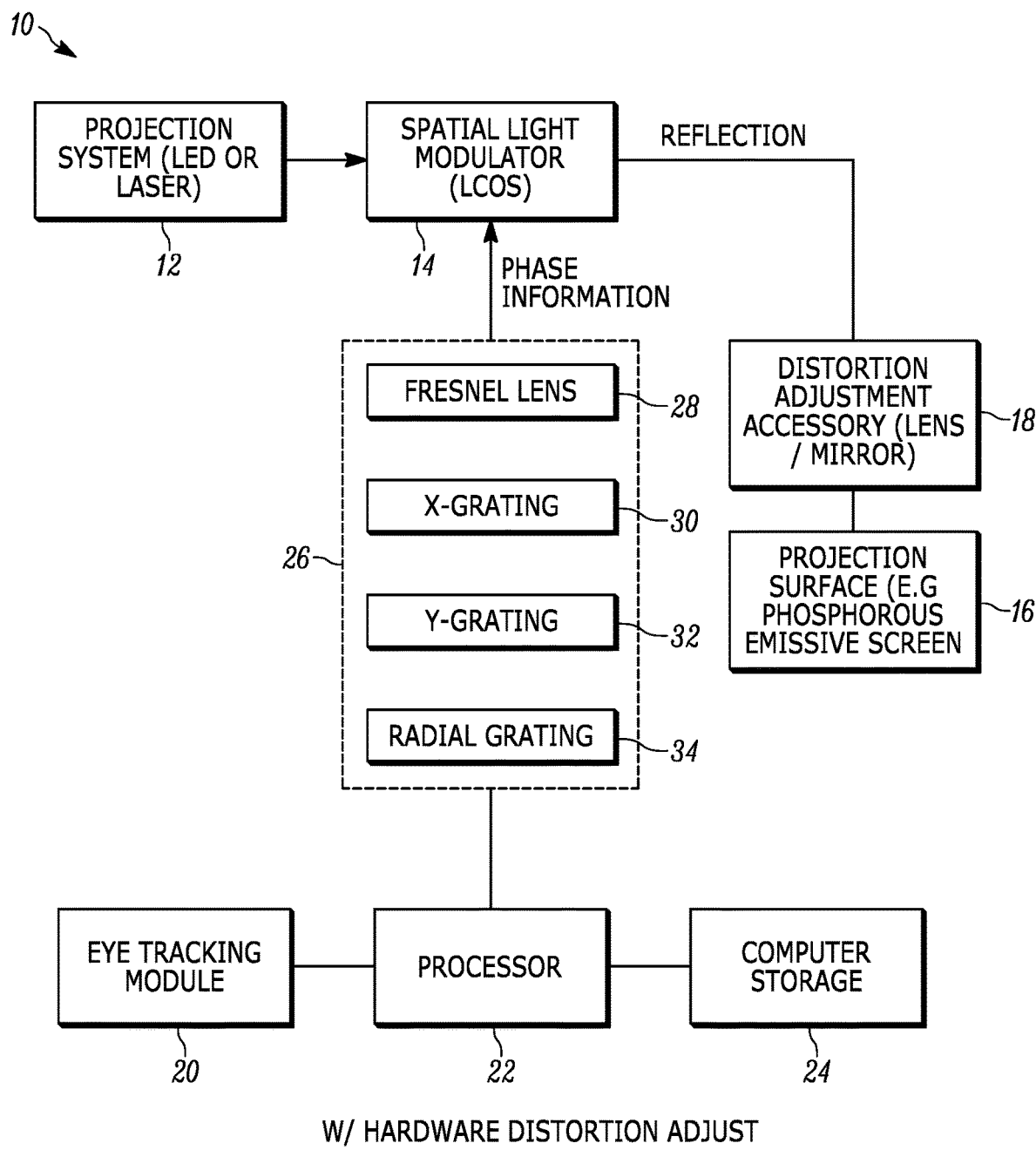
FIG. 1 is a block diagram of an example system consistent with present principles, with an optional hardware-implemented distortion/adjustment assembly.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer of virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser programs that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

FIG. 1 illustrates a system 10 in which a projector system 12 such as a laser, or a light emitting diode (LED)-based projection system or a scanning laser, or a laser liquid crystal on silicon (LCOS), or other suitable projection system transmits light according to demanded images towards a spatial light modulator 14. The spatial light modulator 14 can implement a phase-only image of a Freeform Fourier Lens (FFL), to be described further shortly. The spatial light modulator 14 reflects light toward a projection surface 16 that may be implemented by a phosphor-based emissive display that when excited by one wavelength of light produces another wavelength of light. Or, the projection surface 16 may be implemented by a diffuse screen or a reflective screen or an optical combiner or combination thereof.

In the example shown, a distortion/adjustment assembly 18 such as the above-mentioned keystone adjustment assembly may be interposed in the optical path between the spatial light modulator 14 and the projection surface 16 to correct for an oblique angle of projection and/or non-flat configurations of the projection surface 16. For example, the distortion/adjustment assembly 18 may include one or more lenses, scanning mirrors, prisms, etc. The distortion/adjustment assembly is configured, based on a known projection angles, the curvature or other non-flat configuration of the projection surface 16, to distort the projected image to the projection surface to ensure the projected image appears (without distortion) correct to a user viewing the projection surface.

An eye tracking module 20 sends user gaze pose information (the direction the user is looking, i.e., information pertaining to what portion of the projection surface 16 the user is focusing on) to a processor 22 accessing instructions and information from one or more computer storages 24. The present assignee's U.S. patent application Ser. No. 16/012,022, filed Jun. 19, 2018 and incorporated herein by reference describe details of an example eye tracking module 20, it being understood that present principles are not limited to any particular eye tracking device.

Figure 2:
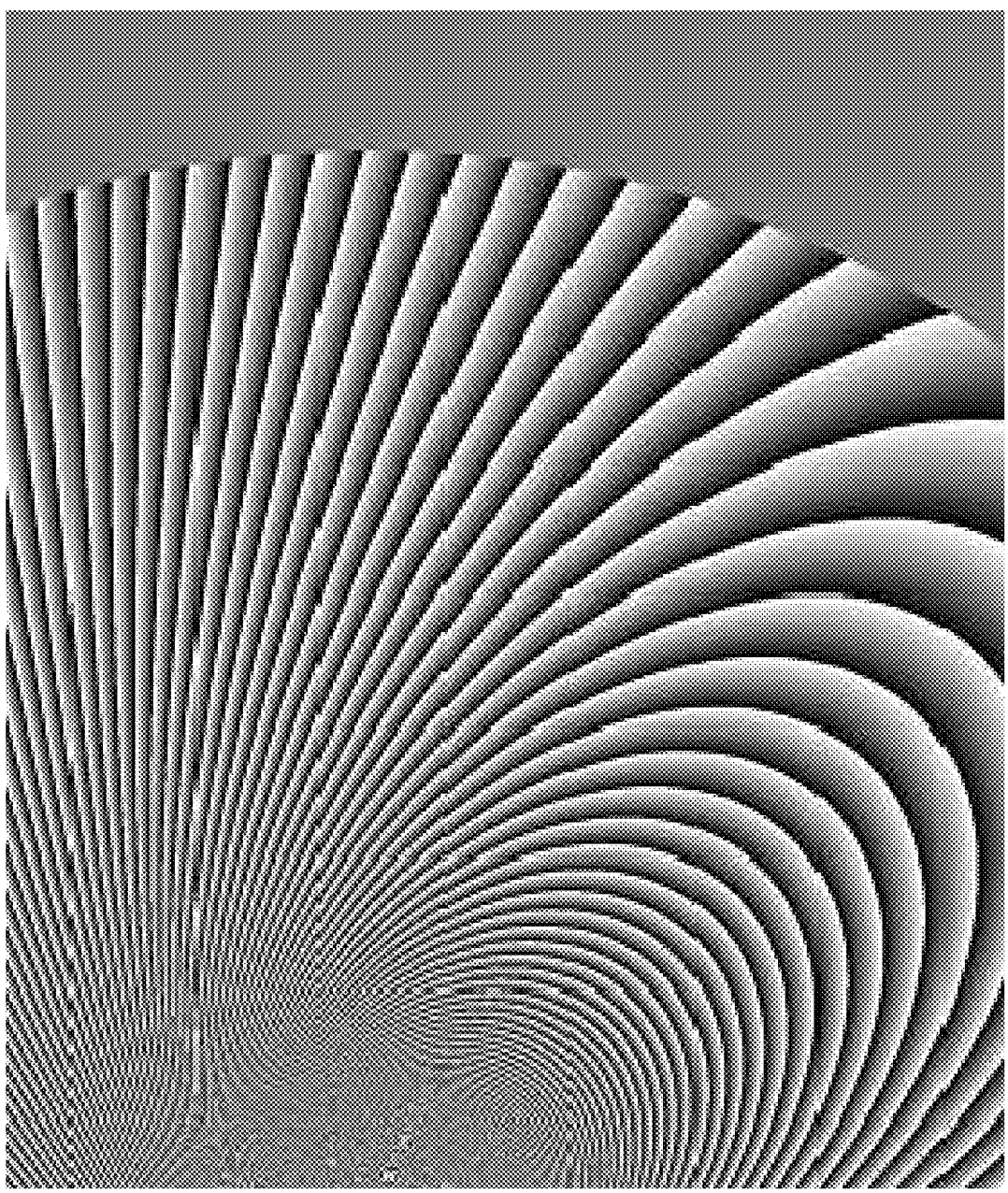
FIG. 2 illustrates in graphical form example non-limiting freeform foveated lens phase data sent to the spatial light modulator.

FIG. 1 indicates that the processor 22 executes a software-implemented FFL 26 that outputs phase information to the spatial light modulator 14 according to user gaze pose information from the eye tracking module 20 such that the spatial light modulator 14 is modified to decrease perceived pixel pitch at the location of the projection surface 16 at which the user is looking. FIG. 2 illustrates in graphical form an 8-bit phase image sent from the FFL 26 to the spatial light modulator 14.

Figure 3:
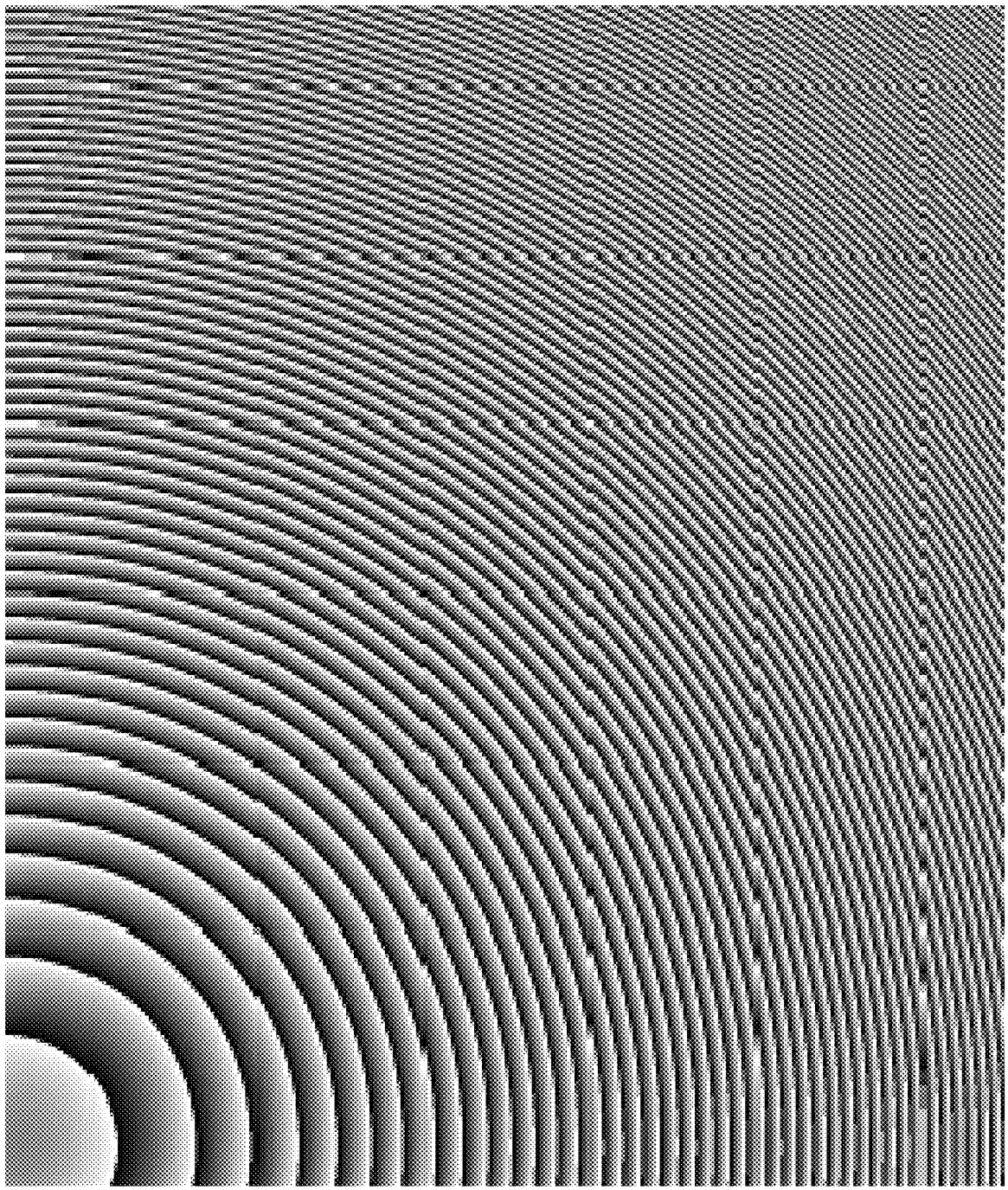
FIG. 3 illustrates in graphical form example non-limiting data output by the Fresnel lens.
Figure 4:
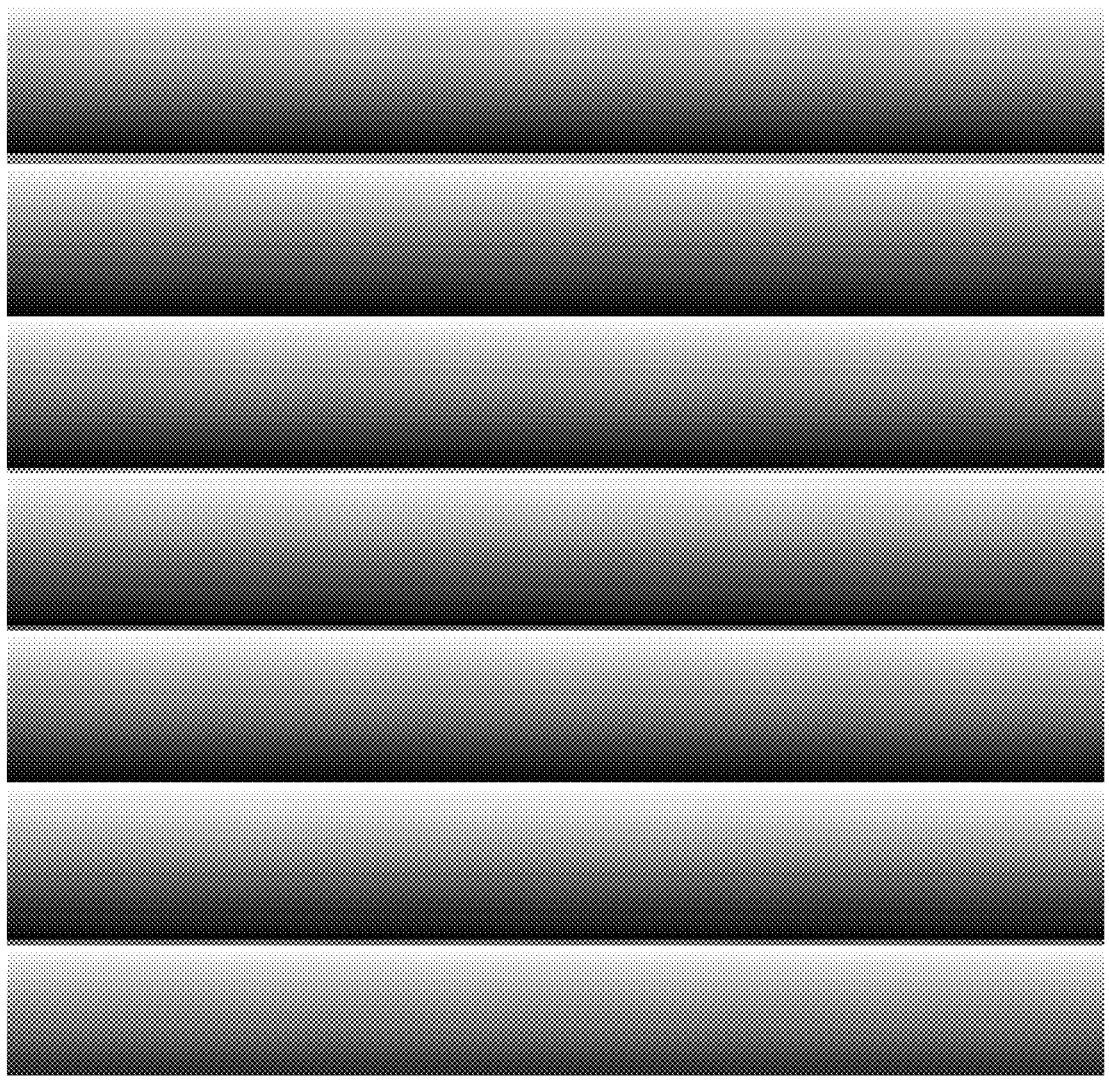
FIG. 4 illustrates in graphical form example non-limiting data output by the y-phase blazed grating.
Figure 5:
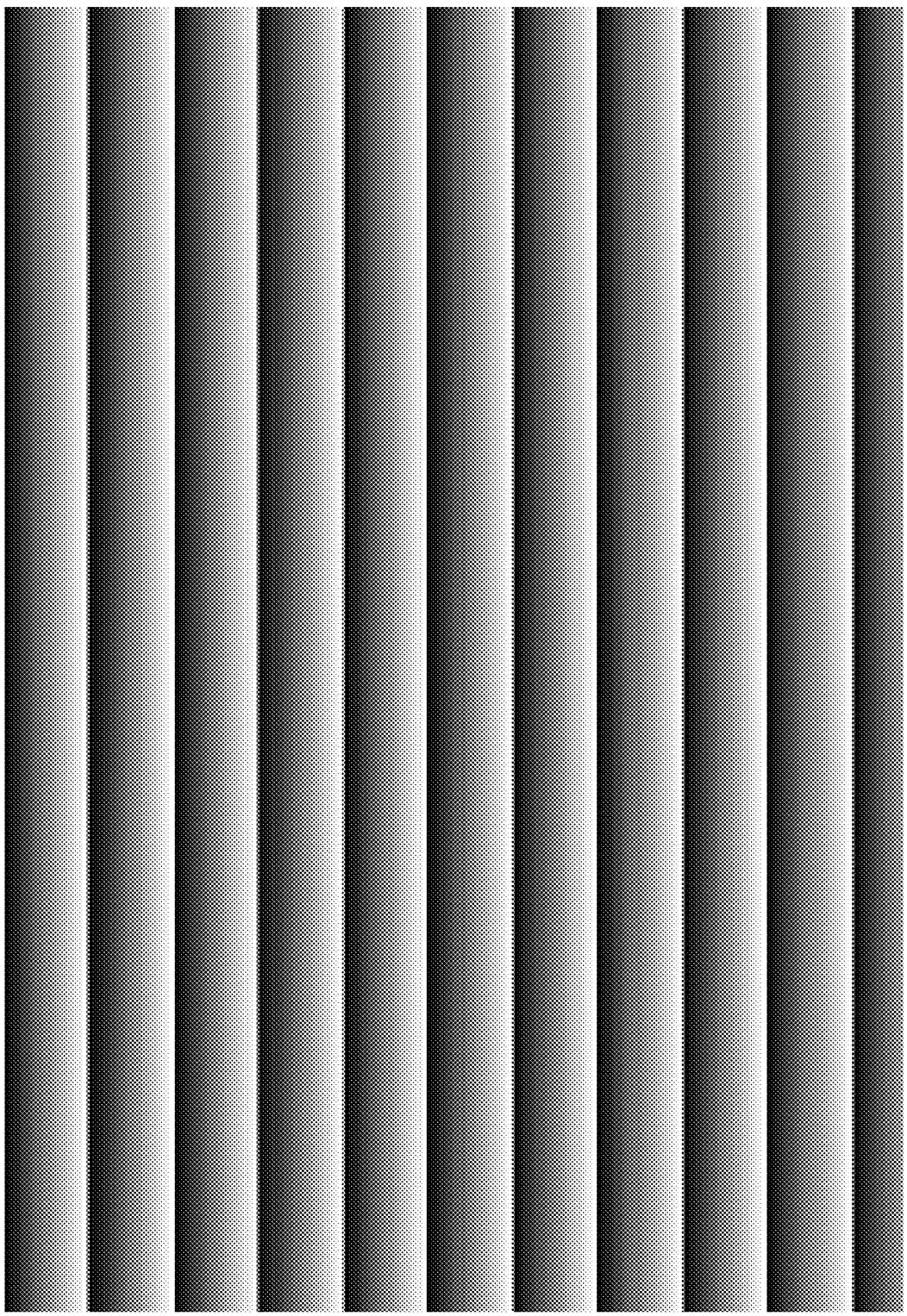
FIG. 5 illustrates in graphical form example non-limiting data output x-phase blazed grating.

As shown in FIG. 1, the FFL 26 includes a Fresnel lens 28, X-phase and Y-phase gratings 30, 32, which may be blaze gratings, and a radial grating 34. FIGS. 3-5 respectively illustrate in graphical form 8-bit phase data output by the Fresnel lens 28, the x-phase grating 30, and the y-phase grating 32.

In addition to the above disclosure, the FFL 26 causes gradual shrinking of a portion of images from the projection system 12 to configure the spatial light modulator 14 for decreasing perceived pixel pitch in at least one foveal area on the projection surface, with the gratings 30, 32, 34 being configurable to move a condensed image center within the image based on a user's eye gaze onto the projection surface 16. In an example, the gratings 30, 32, 34 may be implemented by respective phase images.

Figure 6:
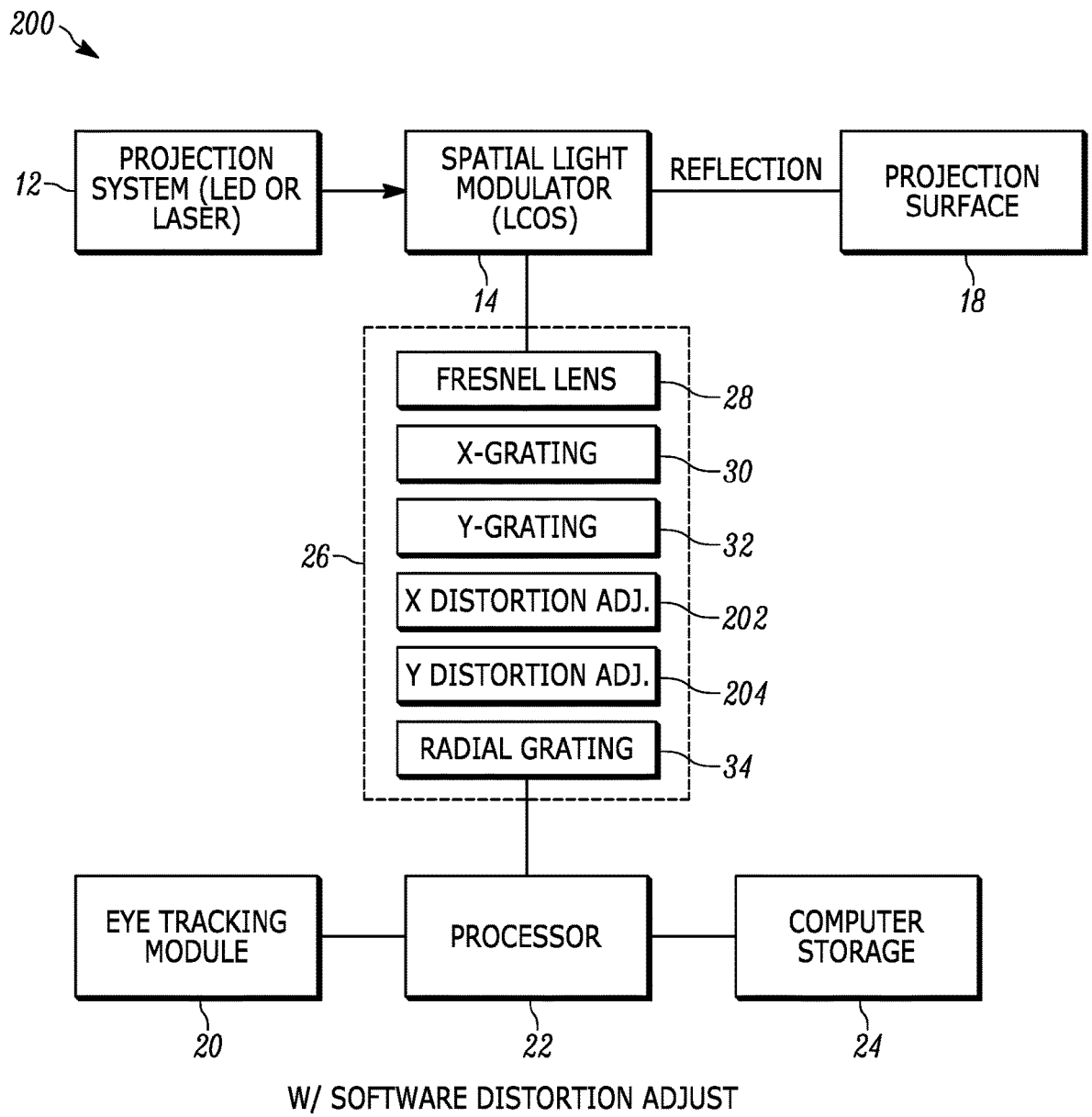
FIG. 6 is a block diagram of an example system consistent with present principles, with an optional software-implemented distortion/adjustment assembly.

FIG. 6 shows a system 200 that in all essential respects is identical to the system 10 shown in FIG. 1 in configuration and operation, with like components sharing like reference numerals, with the following exceptions. Instead of a hardware-implemented keystone adjustment assembly, the system 200 uses a software-based distortion/adjustment assembly that includes a software-implemented x-dimension distortion/adjustment module 202 and a software-implemented y-dimension distortion/adjustment module 204 that are configured to alter information sent to the spatial light modulator 14 as appropriate to correct for or otherwise accommodate the projection angle and/or non-flat surface portions in the projection surface 18.

Figure 7:
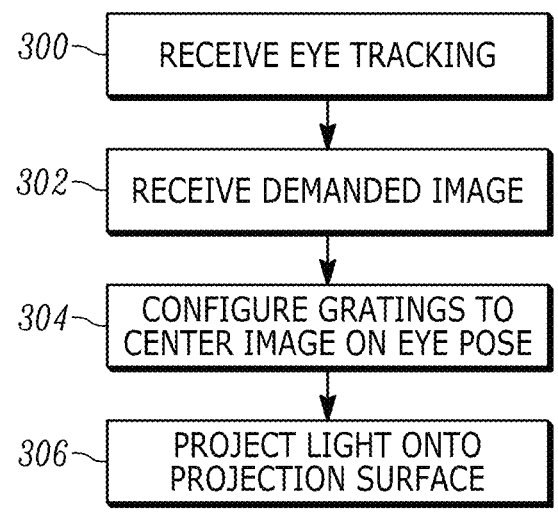
FIG. 7 is a flow chart of example logic consistent with present principles.

FIG. 7 shows a simplified flow chart of example overall logic consistent with present principles. Commencing at block 300, the eye tracking information from the eye tracking module 20 is received. Moving to block 302, demanded images are received, e.g., from a computer game console. Proceeding to block 304, the gratings 30, 32 are configured to alter the phase output of the freeform lens 28 to the spatial light modulator 14 such that the smallest pixel pitch is focused on the region of the projection surface 16 at which the user is directing his gaze. Block 306 indicates that responsive to the demanded images the projection system 12 projects light onto the projection surface 18 by transmitting light to the spatial light modulator 14, which reflects the light to the projection surface 16 in accordance with the phase information from the FFL 26.

Figure 8:
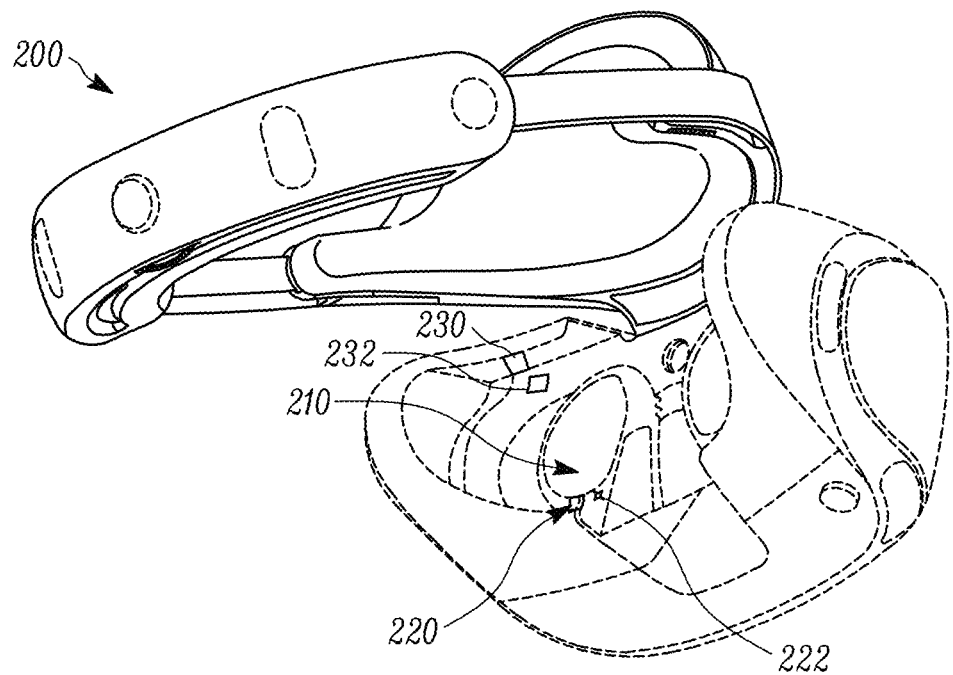
FIG. 8 illustrates an example implementation in a Head Mounted Display.

FIG. 8 shows a head-mounted display 208 with lenses 210 and at least one eye tracking 22s at least one laser light source assembly 222 positioned to illuminate the eye, reflections of which impinge upon the assembly 220 for eye tracking purposes. The present assignee's U.S. patent application Ser. No. 16/012,022, filed Jun. 19, 2018 and incorporated herein by reference describe details of the assemblies 220, 222.

A projection system 230 (embedded in the HMD device 208) such as the one described above projects light onto a projection surface (within the HMD 208, but not shown n FIG. 8) which are viewed by the lenses 210, with the image on the projection surface being adjusted by the spatial light modulator 232 (also embedded in the HMD device 208) such as the one described above according to the eye tracking provided by the assemblies 220, 222. Thus, the projection systems and FFLs described herein may be supported in a head-mounted display (HMD).

Now referring to FIG. 9, an example system 1400 is shown, which may include one or more of the example devices mentioned below in accordance with present principles. The first of the example devices included in the system 1410 is a consumer electronics (CE) device such as an audio video device (AVD) 1412 such as but not limited to an Internet-enabled TV with a TV tuner (equivalently, set top box controlling a TV). However, the AVD 1412 alternatively may be an appliance or household item, e.g. computerized Internet enabled refrigerator, washer, or dryer. The AVD 1412 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 1412 is configured to undertake present principles (e.g. communicate with other CE devices to undertake present principles, execute the logic described herein, and perform any other functions and/or operations described herein).

Figure 9:
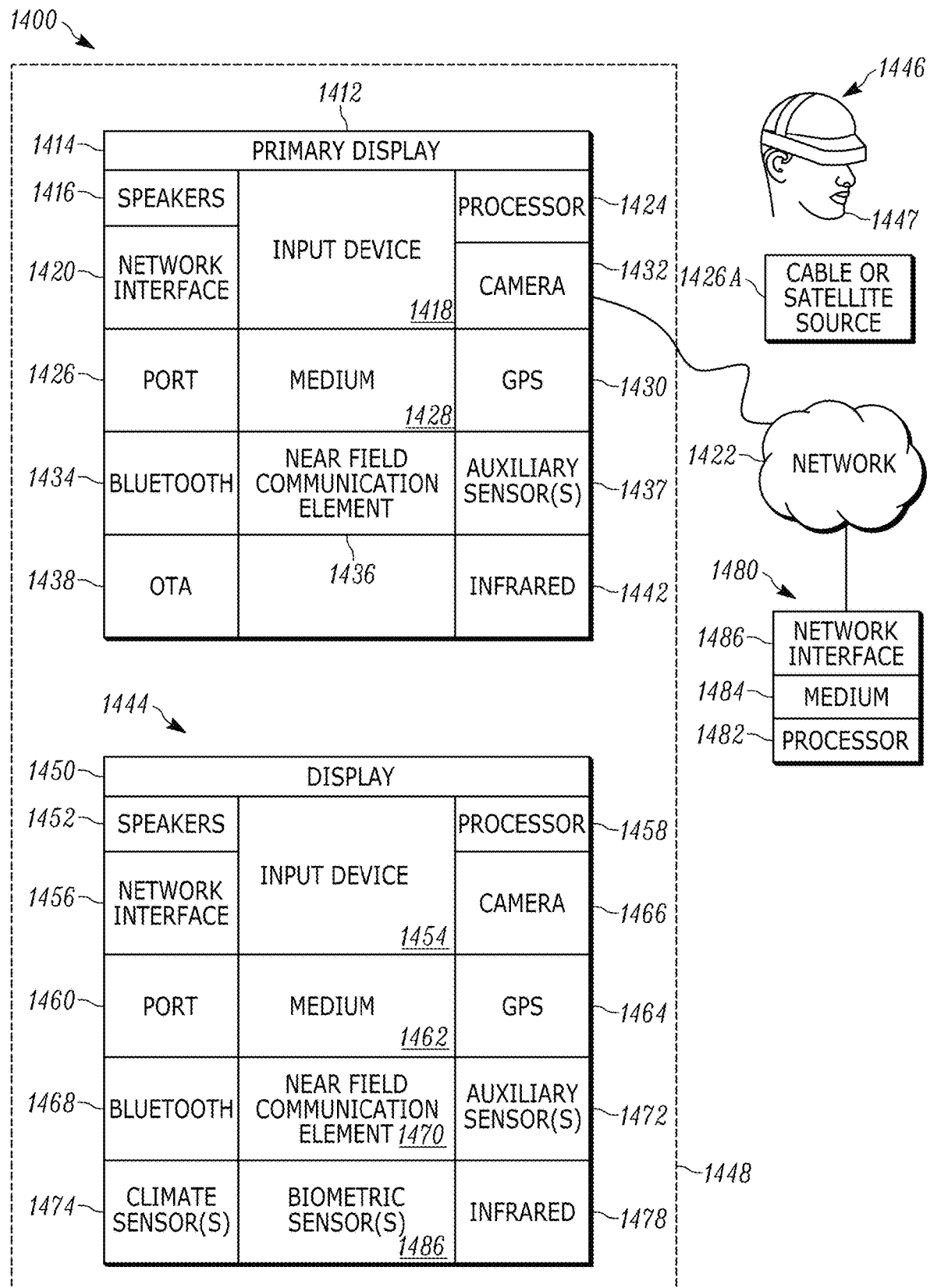
FIG. 9 is a block diagram of an example system in accordance with present principles.

Accordingly, to undertake such principles the AVD 1412 can be established by some or all of the components shown in FIG. 9. For example, the AVD 1412 can include one or more displays 1414 that may be implemented by a high definition or ultra-high definition "4K" or higher flat screen and that may be touch-enabled for receiving user input signals via touches on the display. The AVD 1412 may include one or more speakers 1416 for outputting audio in accordance with present principles, and at least one additional input device 1418 such as e.g. an audio receiver/microphone for e.g. entering audible commands to the AVD 1412 to control the AVD 1412. The example AVD 1412 may also include one or more network interfaces 1420 for communication over at least one network 1422 such as the Internet, an WAN, an LAN, etc. under control of one or more processors 1424 including. A graphics processor 1424A may also be included. Thus, the interface 1420 may be, without limitation, a Wi-Fi transceiver, which is an example of a wireless computer network interface, such as but not limited to a mesh network transceiver. It is to be understood that the processor 1424 controls the AVD 1412 to undertake present principles, including the other elements of the AVD 1412 described herein such as e.g. controlling the display 1414 to present images thereon and receiving input therefrom. Furthermore, note the network interface 1420 may be, e.g., a wired or wireless modem or router, or other appropriate interface such as, e.g., a wireless telephony transceiver, or transceiver as mentioned above, etc.

In addition to the foregoing, the AVD 1412 may also include one or more input ports 1426 such as, e.g., a high definition multimedia interface (HDMI) port or a USB port, to physically connect (e.g. using a wired connection) to another CE device and/or a headphone port to connect headphones to the AVD 1412 for presentation of audio from the AVD 1412 to a user through the headphones. For example, the input port 1426 may be connected via wire or wirelessly to a cable or satellite source 1426a of audio video content. Thus, the source 1426a may be, e.g., a separate or integrated set top box, or a satellite receiver. Or, the source 1426a may be a game console or disk player containing content that might be regarded by a user as a favorite for channel assignation purposes described further below. The source 1426a when implemented as a game console may include some or all of the components described below in relation to the CE device 1444.

The AVD 1412 may further include one or more computer memories 1428 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 1412 can include a position or location receiver such as but not limited to a cellphone receiver, GPS receiver and/or altimeter 1430 that is configured to e.g. receive geographic position information from at least one satellite or cellphone tower and provide the information to the processor 1424 and/or determine an altitude at which the AVD 1412 is disposed in conjunction with the processor 1424. However, it is to be understood that that another suitable position receiver other than a cellphone receiver, GPS receiver and/or altimeter may be used in accordance with present principles to e.g. determine the location of the AVD 1412 in e.g. all three dimensions.

Continuing the description of the AVD 1412, in some embodiments the AVD 1412 may include one or more cameras 1432 that may be, e.g., a thermal imaging camera, a digital camera such as a webcam, and/or a camera integrated into the AVD 1412 and controllable by the processor 1424 to gather pictures/images and/or video in accordance with present principles. Also included on the AVD 1412 may be a Bluetooth transceiver 1434 and other Near Field Communication (NFC) element 1436 for communication with other devices using Bluetooth and/or NFC technology, respectively. An example NFC element can be a radio frequency identification (RFID) element.

Further still, the AVD 1412 may include one or more auxiliary sensors 1437 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 1424. The AVD 1412 may include an over-the-air TV broadcast port 1438 for receiving OTA TV broadcasts providing input to the processor 1424. In addition to the foregoing, it is noted that the AVD 1412 may also include an infrared (IR) transmitter and/or IR receiver and/or IR transceiver 1442 such as an IR data association (IRDA) device. A battery (not shown) may be provided for powering the AVD 1412.

Still referring to FIG. 9, in addition to the AVD 1412, the system 1400 may include one or more other CE device types. In one example, a first CE device 1444 may be used to send computer game audio and video to the AVD 1412 via commands sent directly to the AVD 1412 and/or through the below-described server while a second CE device 1446 may include similar components as the first CE device 1444. In the example shown, the second CE device 1446 may be configured as a VR headset worn by a player 1447 as shown. In the example shown, only two CE devices 1444, 1446 are shown, it being understood that fewer or greater devices may be used. For example, principles below discuss multiple players 1447 with respective headsets communicating with each other during play of a computer game sourced by a game console to one or more AVD 1412, as an example of a multiuser voice chat system.

In the example shown, to illustrate present principles all three devices 1412, 1444, 1446 are assumed to be members of an entertainment network in, e.g., a home, or at least to be present in proximity to each other in a location such as a house. However, present principles are not limited to a particular location, illustrated by dashed lines 1448, unless explicitly claimed otherwise. Any or all of the devices in FIG. 9 can implement any one or more of the lasers, etc. described previously.

The example non-limiting first CE device 1444 may be established by any one of the above-mentioned devices, for example, a portable wireless laptop computer or notebook computer or game controller (also referred to as "console"), and accordingly may have one or more of the components described below. The first CE device 1444 may be a remote control (RC) for, e.g., issuing AV play and pause commands to the AVD 1412, or it may be a more sophisticated device such as a tablet computer, a game controller communicating via wired or wireless link with the AVD 1412, a personal computer, a wireless telephone, etc.

Accordingly, the first CE device 1444 may include one or more displays 1450 that may be touch-enabled for receiving user input signals via touches on the display. The first CE device 1444 may include one or more speakers 1452 for outputting audio in accordance with present principles, and at least one additional input device 1454 such as e.g. an audio receiver/microphone for e.g. entering audible commands to the first CE device 1444 to control the device 1444. The example first CE device 1444 may also include one or more network interfaces 1456 for communication over the network 1422 under control of one or more CE device processors 1458. A graphics processor 1458A may also be included. Thus, the interface 1456 may be, without limitation, a Wi-Fi transceiver, which is an example of a wireless computer network interface, including mesh network interfaces. It is to be understood that the processor 1458 controls the first CE device 1444 to undertake present principles, including the other elements of the first CE device 1444 described herein such as e.g. controlling the display 1450 to present images thereon and receiving input therefrom. Furthermore, note the network interface 1456 may be, e.g., a wired or wireless modem or router, or other appropriate interface such as, e.g., a wireless telephony transceiver, or Wi-Fi transceiver as mentioned above, etc.

In addition to the foregoing, the first CE device 1444 may also include one or more input ports 1460 such as, e.g., a HDMI port or a USB port to physically connect (e.g. using a wired connection) to another CE device and/or a headphone port to connect headphones to the first CE device 1444 for presentation of audio from the first CE device 1444 to a user through the headphones. The first CE device 1444 may further include one or more tangible computer readable storage medium 1462 such as disk-based or solid-state storage. Also in some embodiments, the first CE device 1444 can include a position or location receiver such as but not limited to a cellphone and/or GPS receiver and/or altimeter 1464 that is configured to e.g. receive geographic position information from at least one satellite and/or cell tower, using triangulation, and provide the information to the CE device processor 1458 and/or determine an altitude at which the first CE device 1444 is disposed in conjunction with the CE device processor 1458. However, it is to be understood that that another suitable position receiver other than a cellphone and/or GPS receiver and/or altimeter may be used in accordance with present principles to e.g. determine the location of the first CE device 1444 in e.g. all three dimensions.

Continuing the description of the first CE device 1444, in some embodiments the first CE device 1444 may include one or more cameras 1466 that may be, e.g., a thermal imaging camera, a digital camera such as a webcam, and/or a camera integrated into the first CE device 1444 and controllable by the CE device processor 1458 to gather pictures/images and/or video in accordance with present principles. Also included on the first CE device 1444 may be a Bluetooth transceiver 1468 and other Near Field Communication (NFC) element 1470 for communication with other devices using Bluetooth and/or NFC technology, respectively. An example NFC element can be a radio frequency identification (RFID) element.

Further still, the first CE device 1444 may include one or more auxiliary sensors 1472 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 1458. The first CE device 1444 may include still other sensors such as e.g. one or more climate sensors 1474 (e.g. barometers, humidity sensors, wind sensors, light sensors, temperature sensors, etc.) and/or one or more biometric sensors 1476 providing input to the CE device processor 1458. In addition to the foregoing, it is noted that in some embodiments the first CE device 1444 may also include an infrared (IR) transmitter and/or IR receiver and/or IR transceiver 1478 such as an IR data association (IRDA) device. A battery (not shown) may be provided for powering the first CE device 1444. The CE device 1444 may communicate with the AVD 1412 through any of the above-described communication modes and related components.

The second CE device 1446 may include some or all of the components shown for the CE device 1444. Either one or both CE devices may be powered by one or more batteries.

Now in reference to the afore-mentioned at least one server 1480, it includes at least one server processor 1482, at least one tangible computer readable storage medium 1484 such as disk-based or solid state storage, and at least one network interface 1486 that, under control of the server processor 1482, allows for communication with the other devices of FIG. 9 over the network 1422, and indeed may facilitate communication between servers and client devices in accordance with present principles. Note that the network interface 1486 may be, e.g., a wired or wireless modem or router, Wi-Fi transceiver, or other appropriate interface such as, e.g., a wireless telephony transceiver.

Accordingly, in some embodiments the server 1480 may be an Internet server or an entire server "farm" and may include and perform "cloud" functions such that the devices of the system 1400 may access a "cloud" environment via the server 1480 in example embodiments for, e.g., network gaming applications. Or, the server 1480 may be implemented by one or more game consoles or other computers in the same room as the other devices shown in FIG. 9 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. An apparatus comprising:
    a projection system configured to project an image onto a projection surface through a spatial light modulator operably associated with a phase-only image of a Freeform Fourier Lens (FFL), the FFL comprising a Fresnel lens, an X-phase grating, a Y-phase grating, and a radial grating wherein
    the FFL causes decreasing perceived pixel pitch in at least one area on the projection surface,
    the gratings being configurable to move positions of the at least one area within the image based on a user's eye gaze onto the projection surface.

2. The apparatus of claim 1, wherein the projection system and spatial light modulator are supported in a head-mounted display (HMD) or a video monitor.

3. The apparatus of claim 1, comprising at least one distortion/adjustment assembly configured to distort the image projected to the projection surface in accordance with a projection angle relative to the projection surface and a shape of the projection surface.

4. The apparatus of claim 1, wherein the projection surface comprises a phosphor-based emissive display, that when excited by one wavelength of light produces another wavelength of light.

5. The apparatus of claim 1, wherein the projection surface comprises a diffuse screen or a reflective screen.

6. The apparatus of claim 1, wherein the projection surface comprises an optical combiner.

7. The apparatus of claim 1, wherein the projection system comprises at least one light emitting diode (LED).

8. The apparatus of claim 1, wherein the projection system comprises a laser liquid crystal on silicon (LCOS).

9. The apparatus of claim 1, wherein the projection system comprises a scanning laser.

10. A method, comprising:
identifying a direction of a user's gaze;
projecting, onto a projection surface, an image that contains variable pixel pitch with a higher visual acuity in at least one area of the image than in peripheral portions of the image at least in part using a phase-only image of a Freeform Fourier Lens (FFL); and
moving a position of the at least one area within the image according to the direction of a user's gaze.

11. The method of claim 10, comprising:
operably associating a spatial light modulator with the phase-only image of the FF, the FFL comprising a Fresnel lens, an X-phase grating, a Y-phase grating, and a radial grating;
configuring the FFL to cause gradual shrinking of images from a projection system, decreasing perceived pixel pitch in at least one foveal area on the projection surface; and
configuring the gratings to move the foveal areas within the image based on a user's eye gaze onto the projection surface.

12. The method of claim 11, wherein the projection system and spatial light modulator are supported in a head-mounted display (HMD).

13. The method of claim 11, comprising configuring at least one distortion/adjustment assembly to distort the image projected to the projection surface in accordance with the projection angle and a shape of the projection surface.

14. The method of claim 11, wherein the projection surface comprises a phosphor-based emissive display, that when excited by one wavelength of light produces another wavelength of light.

15. The method of claim 11, wherein the projection surface comprises a diffuse screen, reflective screen or optical combiner.

16. An assembly, comprising:
at least one projection surface;
at least one projection system configured to direct light representing demanded images onto the projection surface;
at least one spatial light modulator interposed in an optical path between the projector and the projection surface to reflect light from the projector onto the projection surface;
at least one processor configured with instructions to:
send phase information to the spatial light modulator according to information from an eye tracking module indicating one or more gaze poses of a user, wherein the processor is configured to:
implement a phase-only image of a Freeform Fourier Lens (FFL), the FFL comprising a Fresnel lens, an X-phase grating, a Y-phase grating, and a radial grating;
configure the FFL to cause gradual shrinking of portions of images from a projection system, decreasing perceived pixel pitch in at least one foveal area on the projection surface; and
configure the gratings to move a position of the portions of images based on a user's eye gaze onto the projection surface.

17. The assembly of claim 16, wherein the projection system and spatial light modulator are supported in a head-mounted display (HMD).

18. The assembly of claim 16, wherein the projection surface comprises a phosphor-based emissive display, a diffuse screen, a reflective screen or an optical combiner.

19. The assembly of claim 16, comprising at least one distortion/adjustment assembly to alter light from the projection system according to a configuration of a projection angle relative to the projection surface and a shape of the projection surface.

* * * * *